Sept. 24, 1940.  G. J. GRIZEY  2,216,007
COUNTER
Filed Sept. 20, 1938  2 Sheets-Sheet 1

Inventor
GEORGE J. GRIZEY
By R. Clay Lindsey
Attorney

Sept. 24, 1940.  G. J. GRIZEY  2,216,007
COUNTER
Filed Sept. 20, 1938  2 Sheets-Sheet 2
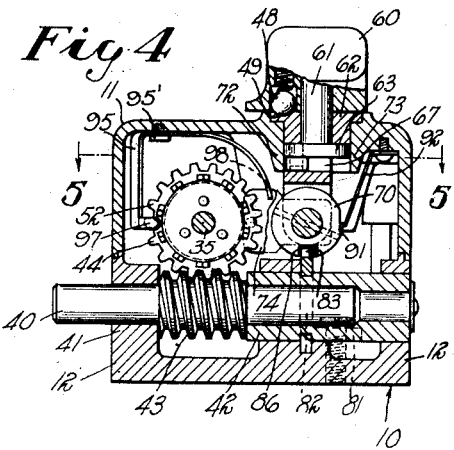
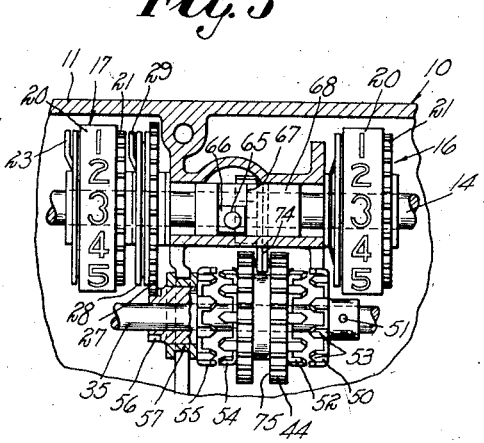
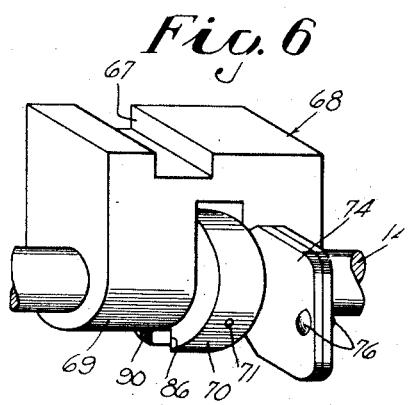
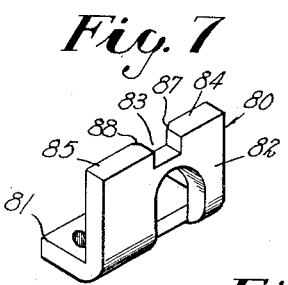
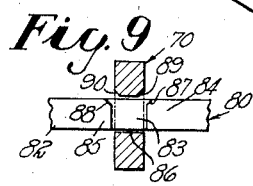
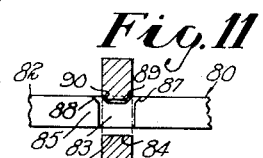
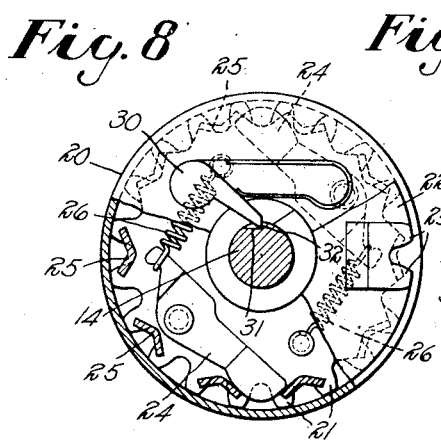
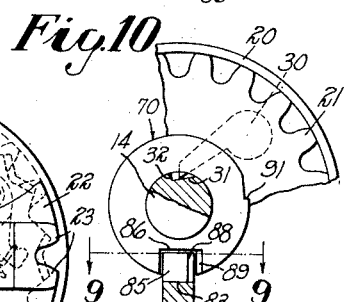
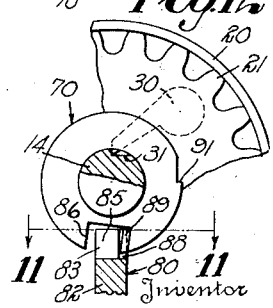
INVENTOR
GEORGE J. GRIZEY
By W. Clay Lindsey
Attorney Patented Sept. 24, 1940

2,216,007

UNITED STATES PATENT OFFICE 2,216,007

COUNTER

George J. Grizey, Canton, Conn., assignor to Veeder-Root Incorporated, Hartford, Conn., a corporation of Connecticut Application September 20, 1938, Serial No. 230,834

15 Claims. (Cl. 235—144)

This invention relates to counters of the type having a plurality of denominational order wheels, and means for resetting the same. It has particular reference to a registering mechanism having a plurality of counters adapted to register the number of operations or sequences of movements of a machine or the like during different times or shifts. As an example of a use to which my improved registering mechanism may be applied, reference may be had to the counting of the number of picks performed on a loom during each of several shifts in order to determine the amount of pay to be received by the several operators. It is, of course, apparent that my improved counter may have other uses.

An aim of the invention is to provide an improved, simplified, and inexpensive registering mechanism which is tamperproof in that the operator of the machine cannot, by manipulating the resetting means, fraudulently change the count as indicated by the counter wheels, and to accomplish this aim of the invention without the use of keylocks, such as have heretofore been generally used.

Further objects of the invention are to provide an improved registering mechanism which is reliable and accurate in operation; and which is so constructed and arranged that upon a resetting operation all of the wheels will be picked up and turned or returned to correct zero positions.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 4 is a vertical transverse sectional view through the mechanism, the same being taken substantially on line 4—4 of Fig. 2;

Fig. 5 is a detail view of the central portion of the mechanism, the same being taken on the vertical plane indicated by the line 5—5 in Fig. 4;

Fig. 6 is a detail view showing, in perspective, a reset locking collar or disc associated with the reset shaft, and a slide block through which the reset shaft and the driving clutches are shifted;

Fig. 7 is a detail view of the locking bar or plate which is adapted to cooperate with the reset locking collar;

Fig. 8 is an elevated side view of one of the counter units, parts being broken away;

Fig. 9 is a fragmentary sectional view illustrating the locking collar and bar in neutral or resetting position, taken on the line 9—9 of Fig. 10;

Fig. 10 is a fragmentary elevational view, partly in section, of the parts shown in Fig. 9;

Fig. 11 is a fragmentary sectional view illustrating the locking collar and bar just after the counter wheels have been reset, taken on the line 11—11 of Fig. 12; and Fig. 12 is a fragmentary elevational view, partly in section, of the parts shown in Fig. 11.

Figure 2:
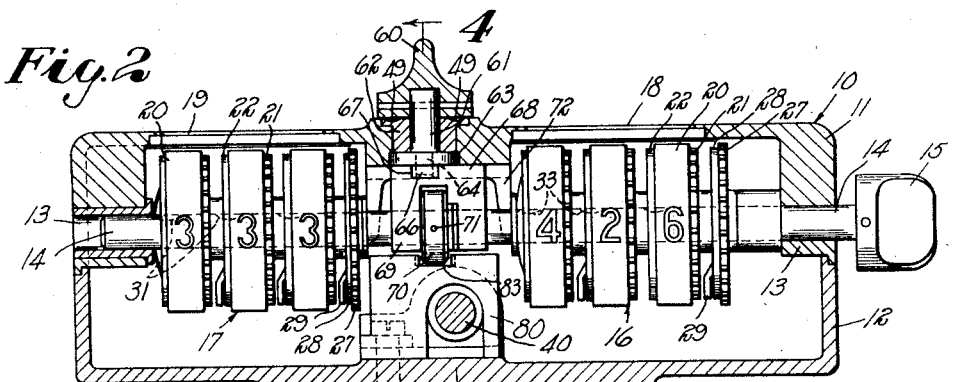
Fig. 2 is a horizontal sectional view therethrough, the same being taken substantially on line 2—2 of Fig. 1.

Referring to the drawings in detail, 10 designates an elongated, rectangular-shaped casing composed of a front part 11 and a rear part 12. Located within the casing are a plurality (in the present instance, two) counters 16 and 17, each having a plurality of counter units operatively connected together so that upon a complete rotation of the unit of lower order the unit of next higher order is advanced one step. While these counters may, be variously arranged, they are shown in the present illustrative disclosure as being mounted in aligned relation upon a reset shaft 14 (Fig. 2). The reset shaft is mounted within bearings 13 in the end walls of the front part of the casing and carries at one end an operating knob or handle 15. The reset shaft has a limited longitudinal movement and, when in the neutral or mid-position shown in the drawings, it is adapted to be rotated in a direction to reset the counters. The front wall of the casing is provided with windows 18 and 19 through which readings of the respective counters 16 and 17 may be taken.

Figure 1:
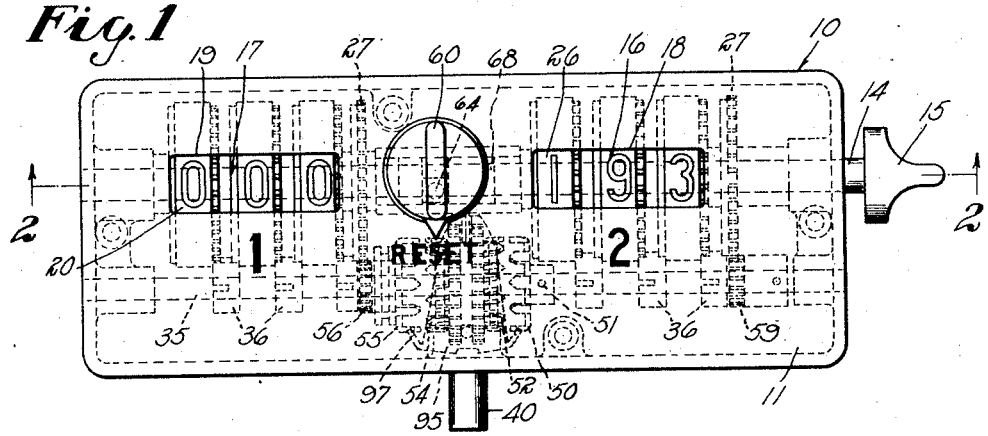
Figure 1 is a front view of a registering mechanism in which my invention is incorporated, by driving clutches being shown in neutral position.

The counters may be of any suitable construction, those shown in the drawings being generally of a well-known type. In the present instance, each counter is shown, for illustrative purposes only, as having three counter wheel units. Each unit may comprise a counter wheel 20 provided on its periphery with numerals from zero to nine; a driven or so-called "twenty tooth" gear 21 (Fig. 2) operatively connected to the associated counter wheel by means of a one-way drive or ratchet (Fig. 8); and a locking disk 22 fixed to the numeral wheel and carrying a mutilated driving gear 23 comprising two teeth with a notch therebetween. As is usual, the one-way drive or ratchet may comprise pawls 24 pivoted to the driven gear 21 and cooperating with teeth 25 carried on the interior of the counter wheel. Springs 26 urge the pawls against the teeth. If desired, there may be provided in advance of each counter wheel of lowest order, a non-resettable counter unit which comprises a gear 27 and a locking disk 28, the latter having a mutilated or two-toothed gear 29 (Fig. 2). Pivotally carried by each of the counter wheels 20 is a reset pawl 30 which is adapted to be picked up by the reset shaft 14 when the latter is rotated so that the counter wheels may be returned to zero upon a resetting operation. The reset shaft 14 has longitudinally spaced notches 31 (Figs. 2, 8, 10 and 12) which register with the respective reset pawls of the counter units when the shaft is in the resetting position shown in Figs. 1, 2, and 3. Each notch has a radially extending face 32 and a longitudinally curved face 33 (Fig. 2) generally at right angles to the radial face. The radial face 32 forms a shoulder against which the free end of the pawl is adapted to engage whereby, when the shaft is rotated in the proper direction, the shaft will pick up the pawls, and the numeral wheels will be reset to zero. When the reset shaft is in either of its extreme longitudinal positions (in which event one or the other of the counters, as may be the case, is connected to the drive and the reset shaft is held against rotation, as will later be explained) the reset pawls engage the portions of the reset shaft between the notches. In the present illustrative disclosure, the arrangement is such that the counter wheels, during a resetting operation, are rotated in a forward direction, that is in the direction in which they are rotated during the registering operation, but it will be obvious that the parts may be easily rearranged so that the counter wheels may be rotated during resetting in a direction reverse to that in which they are rotated during registering.

Journalled in the end walls of the front part of the casing 10 and arranged in parallel relation to the reset shaft, is a driven shaft 35 (Figs. 1, 3, 4 and 5) on which are mounted the usual transfer pinions 36 through which a carrying movement is transferred from a wheel of lower order to a wheel of higher order upon each complete revolution of the wheel of lower order. These transfer pinions are of the usual construction, the same having alternate long and short teeth. All of the teeth are adapted to mesh with a driven gear 21 of higher order and the long teeth are adapted to cooperate with the mutilated gear 23 of lower order and also cooperate with the locking disk 22 so as to prevent rotation of the transfer pinions except when the same are rotated by the mutilated gear.

The counters are adapted to be selectively driven from a drive shaft 40 (Figs. 1, 2 and 4) journalled in the bearings 41 and 42 and carrying a worm 43 meshing with a worm wheel 44 slidably mounted on the driven shaft 35. The worm wheel is adapted to be selectively shifted into driving engagement with the counters, and it has a neutral position in which it is disconnected from both of the counters. In the present illustrative disclosure, the breakable connections between the worm wheel and the counters are in the form of toothed or dental clutches but, obviously, any suitable clutch arrangement may be employed.

Figure 3:
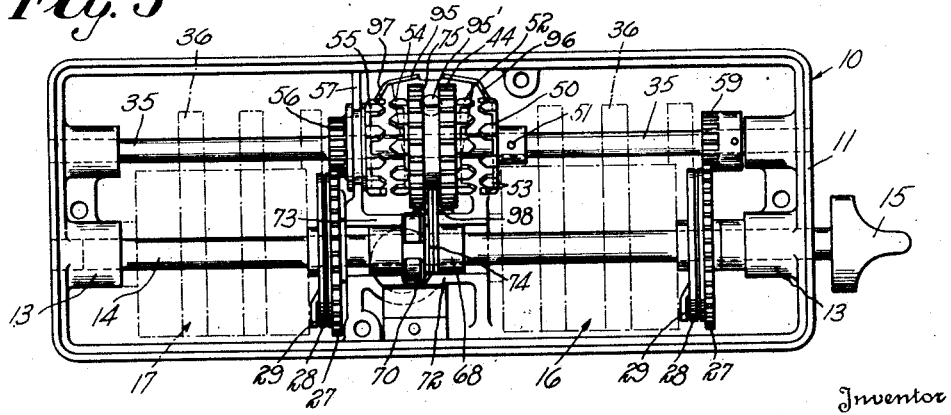
Fig. 3 is a view looking at the rear of the mechanism with the rear half of the casing removed and with the counter wheels and transfer pinions diagrammatically shown by broken lines.

The clutch associated with the counter 16 comprises a clutch member 50 fixed to the driven shaft 35 as by means of a pin 51, and a clutch member 52 fixed to one face of the worm gear 44 (Figs. 3 and 5). These members have interengaging fingers or teeth 53. The clutch associated with the other counter 17 is located to the other side of the worm wheel, and comprises clutch members 54 and 55 respectively similar to the clutch members 50 and 52 but, in this instance, the driven clutch member 55 is carried by a gear 56 loose on the shaft 35 and journalled in a bracket 57 carried by the front wall of the casing. This gear 56 meshes with the gear 27 forming a part of the first counter unit of the counter 17. Fixed to the driven shaft 35 is a gear 58 which meshes with the gear 27 of the first counter unit of the counter 16. It is clear that when the worm wheel 44 is in the neutral position shown in Fig. 3, both of the clutches are disengaged so that neither of the counters may be driven at this time. When the worm wheel is shifted to the right, the clutch members 50 and 52 are engaged, and the counter 16 is driven through the shaft 35 and the gear 59. When the worm wheel is shifted to its left hand position, the clutch members 54 and 55 are engaged and the counter 17 is driven through the gear 56.

For the purposes of shifting the clutch means to its several positions and also for simultaneously moving the reset shaft longitudinally, a manually operable or resettable member in the form of a knob 60 is provided. The knob is adapted to be selectively set into three positions, namely, a mid-position (shown in Fig. 1) in which both of the clutches are disengaged, a right hand position in which the counter 16 is connected to the drive, and a left hand position in which the counter 17 is connected to the drive. For the purpose of holding the knob in each of its positions, the knob carries a spring pressed ball 48 adapted to engage in recesses 49 in the front face of a bushing 62 (Figs. 2 and 5). The knob 60 is fixed to the forward end of a stem 61 journalled in the bushing 62 fixedly located in an opening in the front wall of the casing. The stem has on its rear end a head 63 provided with an eccentric pin 64 which engages in an opening 65 in a bearing block 66 (Figs. 2 and 5). This bearing block is adapted for sliding movement in a vertical groove 67 in the front face of a slide piece or block 68. This slide block is bifurcated so as to provide a pair of arms 69 between which a reset locking collar 70 is accommodated.

The reset shaft is rotatable with respect to, and extends transversely through, arms 69, and the reset locking collar 70 is secured to the reset shaft as by means of a pin 71. The forward end of the slide block 68 engages in a groove or guideway provided between parallel flanges 72 and 73, integral with and projecting rearwardly from the front wall of the casing member 11 (Fig. 4). Slidably movable with the slide block 68, the reset shaft, and the reset locating collar is a clutch lever or arm 74 which is in the form of two abutting plates, the upper ends of which are apertured to receive the reset shaft. These upper ends are located between the reset locking collar 70 and one of the yoke arms 69 (Fig. 6). The worm wheel 44 is provided with a circumferential groove 75 into which the free or lower end of the clutch lever or arm 74 extends. The opposite faces of the clutch arm are provided with nibs or slightly dome-shaped raised portions 76 which are adapted to respectively engage the opposite side walls of the groove 75. These nibs are provided in order to eliminate excessive friction between the clutch arm and the worm wheel.

Cooperating with the reset locking collar 70 is a locking bar or plate 80 (Fig. 7), the arrangement being such that when both of the counters are disconnected from the drive, the reset shaft may be turned to reset the counters, but when either of the counters is connected to the drive, the reset shaft cannot be turned. The locking bar is in the form of an angled member having a leg or flange 81 which may be secured by means of screws to the rear wall of the casing member. The other leg or flange 82 of the locking bar is in the horizontal plane which includes the reset shaft 14. The forward edge of the locking bar flange 82 is provided with a central notch 83 and lugs 84 and 85 disposed at opposite sides of the notch. The reset locking collar 70 has in its periphery a single notch 86 adapted to receive the lug 85 when the clutch associated with the counter 17 is engaged and adapted to receive the lug 84 when the other clutch is engaged. When the clutch means are in neutral position, the notch 83 of the locking bar accommodates the locking disk so that the reset shaft may be turned to reset the counters.

In order to insure that all the reset pawls are picked up and therefore all of the counter wheels will be reset or returned to correct zero position, the upper adjacent corners of the lugs 84 and 85 are respectively beveled, as at 87 and 88, and the corners of one face of the notch 86 are beveled as at 89 and 90. Figs. 11 and 12 show the portion of the parts upon a completion of a resetting operation, it being observed that the shoulders 32 of the reset notches 31 abut against the ends of the reset pawls 30 and the notch 86 in the reset locking collar 70 is slightly out of line with the lugs 84 and 85 of the locking bar 80. When the selector knob 60 is now turned to engage either of the counters with the drive, the reset shaft 14 is moved longitudinally. If the shaft is moved to the left, for example, (as indicated by the arrow in Fig. 11) the opposing beveled or cam edges 88 and 90 are brought into engagement so that the reset shaft will be rotated slightly in the retrograde direction and will be positioned to enable the notch 86 to receive the lug 85. When it is desired to reset the counter, in the present instance the left hand one 17, the knob 60 is turned anti-clockwise to the neutral position shown in Fig. 1 and the reset shaft is moved longitudinally to the right to bring the collar 70 in the position shown in Fig. 9. It is now observed, particularly from Fig. 10, that the shoulders 32 of the reset notches are slightly rearwardly from the position shown in Fig. 12 so that upon a subsequent resetting operation the pawls of all of the counter wheels will be picked up, including the pawls of the counter wheels which during the registering of the wheels have almost, but not quite, reached the zero position. Obviously the beveled cam surfaces 87 and 89 serve a similar purpose in connection with the operations in resetting the counter 16.

It is observed that when the reset shaft is in the position shown in Fig. 3 of the drawings, the notch 86 of the locking collar 70 is generally aligned with the lugs 84 and 85 of the locking bar so that the reset shaft and the collar thereon may be shifted longitudinally. Upon initial rotation of the reset shaft, the shaft can no longer be moved longitudinally because the unnotched portion of the locking collar is between the lugs.

In order to prevent the operator from falsifying the count as indicated by the registers by only partially rotating the reset shaft in a resetting direction and then turning the shaft back to its normal position, the collar 70 has a tooth 91 on its periphery with which cooperates a dog 92 (Fig. 4). This dog is in the form of a spring strip or leaf secured to the casing and having its free end riding upon the periphery of the collar.

When the worm wheel 44 has been shifted, for example to cause the clutch members 50 and 52 to engage preliminary to operating one of the counters, it is desirable to prevent accidental movement of the other counter, and when both of the clutches are disengaged it is desirable to prevent accidental movement of either of the counters. For example, such accidental movement might be occasioned when the counter mechanism is connected to a machine, such as a loom, the jarring and vibration of which may cause movement of the counters unless means is provided to prevent it. To accomplish this in a convenient manner, a brake lever 95 is pivotally mounted at 95' in the casing intermediate the clutches, which has a pair of spring fingers 96 and 97 adapted to engage the clutch members 50 and 55 respectively. Preferably, while the reset shaft and worm wheel are in neutral or resetting position (Fig. 3) the fingers 96 and 97 engage the clutch members 50 and 55 lightly. However, when clutch members 50 and 52 are in meshing relation the spring finger 97 locks the clutch member 55. Likewise, when the clutch members 54 and 55 are in meshing relation the spring finger 96 locks the clutch member 50. This is accomplished by fitting the worm gear shifting lever 74 into a notch 98 at the free end of the brake lever so that by shifting the lever 74 in a direction to cause one pair of clutch members to engage, the brake lever is moved in the opposite direction to lock one of the members of the other clutch.

From the foregoing description taken in connection with the accompanying drawings, it is obvious that my improved arrangement is such that the operator cannot fraudulently manipulate the mechanism in such manner as to increase a properly registered count on either of the counters, and this object is obtained in a very simple and effective manner and without the use of key or permutation locks. When the reset shaft is in either of its extreme longitudinal positions, in which event one or the other of the counters is connected to the drive, the reset shaft cannot be turned because one of the lugs of the locking bar engages in the single notch of the locking collar 70 and in any event the counter wheels could not be picked up by the reset shaft because the reset pawls 30 of the several counter units engage the unnotched portions of the reset shaft. At this time, the counter wheels cannot be fraudulently advanced by tapping on the knob of the reset shaft because the reset shaft is held against rotation and the reset notches of the shaft are out of registry with the reset pawls. When it is desired to reset either of the counters, it is necessary to move the reset locking collar to a position where it registers with the notch in the locking bar, and when this is done both of the clutches in the drive are disengaged, it being observed that the single setting member or knob 60 controls the positions of both of the clutches and the locking collar. In this position of the parts, the knob 60 is in the reset position shown in Fig. 1. The reset shaft may now be rotated by turning the handle or knob 15 in the proper direction (in the present instance, clockwise, reference being had to Fig. 4) and when this is done, the notches of the shaft being in registry with the reset pawls, the counter wheels are picked up and, after one complete revolution of the reset shaft, all of the wheels will indicate zero. After the operator has once initiated the resetting operation by turning the reset shaft, he cannot then turn the reset shaft backwardly to normal position nor can he move the reset shaft longitudinally to engage either of the counters until after he has completed the resetting operation. As soon as the operator starts to turn the reset shaft in the resetting direction, the dog 92 engages behind the tooth 91 of the locking disk so that the reset shaft cannot be turned backwardly and the notch 86 is moved out of registry with the locking lugs 84 and 85 so that the reset shaft cannot be moved longitudinally. Thus, if the operator attempts to falsify the count by manipulating the reset shaft, he will find it necessary, in order to avoid detection of his action, to complete the resetting operation and thus wipe out the registered number of operations of the machine for which he would have been entitled to be paid. He thus penalizes himself.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a plurality of counters each having operatively connected counter wheels, means for resetting said wheels, drive means, manually operable means for selectively connecting said counters to said drive means, and means controlled by said manually operable means for locking said resetting means against operation except when the counters are disengaged from the drive.

2. In combination, a plurality of counters each having operatively connected counter wheels, drive means, breakable connections between said drive means and counters, manually operable means for selectively rendering said connections effective, means for resetting said counters, and means operatively connected to and controlled by said manually operable means for locking said resetting means against operation when any one of said breakable connections is rendered effective.

3. In combination, a pair of counters each having operatively connected counter wheels, drive means for said counters, means for selectively connecting said drive means to said counters, resetting mechanism for said counter wheels including a reset shaft, means associated with said drive connecting means for locking said shaft against operation when either of said counters is connected to said drive means.

4. In combination, a pair of counters each having operatively connected counter wheels, drive means for said counters, clutches for respectively connecting said counters to said drive means and having a neutral position, resetting mechanism for said counters including a reset shaft on which said wheels are mounted, means for locking said shaft against rotation when either of said clutches is in effective position, and manually operable means for moving said clutches selectively into effective positions and neutral position and for controlling said locking means.

5. In combination, a plurality of counters having operatively connected counter wheels, drive means, breakable connections between said drive means and counters, means for resetting said counters, means for locking said resetting means against operation when any one of said breakable connections is engaged, said locking means comprising a locking element rotatable with said resetting means and a locking bar element, one of said elements being shiftable into locking and unlocking positions with respect to the other element, and manually operable means for selectively connecting said breakable connections and simultaneously shifting said shiftable element.

6. In combination, a pair of counters each having operatively connected counter wheels, drive means for said counters, clutches for respectively connecting said counters to said drive means and having a neutral position, resetting mechanism for said counters including a reset shaft on which said wheels are mounted, means for locking said shaft against rotation when either of said clutches is in effective position, said locking means including a locking element rotatable with said reset shaft and a cooperating locking bar element, one of said elements being shiftable into and out of locking relation with the other, and manually operable means for selectively moving said clutches into effective and neutral positions and for controlling said shiftable element, said elements being arranged to prevent rotation of said reset shaft when either of said counters is connected to said drive means and to prevent the shiftable member from being shifted except when said reset shaft is in zero position.

7. In combination, a plurality of counters each having operatively connected counter wheels, a drive therefor, clutches for respectively connecting said counters to said drive and having a neutral position, resetting mechanism for said counters including a rotatable shaft, a locking collar element on said shaft, a locking bar element having a notch for accommodating said collar element, said collar element having a notch adapted to accommodate the portions of said locking bar element at the sides of said notch therein, one of said elements being shiftable into and out of locking engagement with the other element, said shaft being rotatable when the collar element is located in the notch of the locking bar element, and manually operable means for selectively connecting said clutches and for moving said shiftable locking element into and out of locking engagement with the other element.

8. In combination, a plurality of counters each having operatively connected counter wheels, drive means therefor, clutches for respectively connecting said counters to said drive means and having a neutral position, resetting mechanism for said counters including a rotatable shaft, a locking collar rotatable with said shaft and shiftable in the direction of the length of said shaft, a locking bar having a notch for accommodating said collar, said collar having a notch adapted to accommodate portions of the locking bar at the sides of the notch therein, and manually operable means for moving said clutches selectively into effective and neutral positions and for shifting said collar into locked position when a clutch is engaged and into unlocked position when the clutches are in neutral position.

9. In combination, a pair of aligned counters each having operatively connected counter wheels, drive means for said counters, breakable connections for respectively connecting said counters to said drive means and having a neutral position, a reset shaft on which said counter wheels are rotatably mounted, a locking collar rotatable with said shaft and movable longitudinally thereof and having a notch in its periphery, a locking bar having a notch for accommodating said collar and lugs adjacent said notch adapted to be accommodated by the notch of said locking collar, and a manually operable member for moving said breakable connections selectively into effective and neutral positions and for shifting said locking collar.

10. In combination, a pair of counters each having operatively connected counter wheels, a longitudinally shiftable reset shaft rotatable in one direction to reset said wheels, a locking collar fixed to said shaft and having a notch, a locking bar having a notch for accommodating said collar and lugs adjacent said notch adapted to extend into the notch of said collar, and means for shifting said shaft and collar longitudinally.

11. In combination, a counter having operatively connected counter wheels, a rotatable reset shaft on which said wheels are rotatably mounted, means for locking said shaft against rotation during a registering operation and including co-operating locking elements, one of which is rotatable with said shaft and one of which is shiftable relative to the other, means for relatively shifting one of said elements into and out of locking position, and interengaging cam surfaces on said elements for causing the rotatable member to rotate slightly in a retrograde direction when said shiftable element is shifted to locking position.

12. In combination, a pair of counters having operatively connected counter wheels, a reset shaft on which said wheels are rotatably mounted and adapted to be rotated in one direction to reset said wheels, a locking collar element rotatable with said shaft and having a notch, a locking bar element having a notch adapted to receive said collar element and having lugs adjacent said notch adapted to extend into the notch in said collar element, and means for shifting one of said elements into and out of locking relation to the other, said notches on said elements having co-operating cam surfaces whereby when the shiftable element is shifted into locking position said reset shaft is rotated slightly in a retrograde direction.

13. In combination, a pair of counters each having a plurality of operatively connected counter wheels provided with reset pawls, a longitudinally shiftable reset shaft supporting said wheels and having longitudinally spaced recesses adapted to be brought into registry with said pawls, a locking collar secured to said shaft and having a notch, a stationary locking bar having a notch adapted to receive said collar when said reset shaft is in resetting position, said locking bar having lugs adapted to be accommodated by the notch of said collar when the reset shaft is out of resetting position, and means for shifting said shaft and collar longitudinally, said notches having cooperating beveled corners arranged to turn the reset shaft slightly in a retrograde direction when the reset shaft is shifted from resetting position.

14. In combination, a plurality of counters each having operatively connected counter wheels, drive means, clutches for respectively connecting said drive means to said counters and each having a driving member and a driven member adapted to be engaged by said driving member, means for resetting said counters, means for locking said resetting means against operation when either of said clutches is connecting said drive means to one of said counters, brake means for holding the disengaged driven clutch elements against rotation, and manually operable means for selectively connecting said clutches and controlling said locking means and said brake means.

15. In combination, a pair of aligned counters each having a plurality of operatively connected counter wheels provided with reset pawls, a longitudinally shiftable reset shaft supporting said wheels and having longitudinally spaced recesses adapted to register with said pawls, drive means, clutches for respectively connecting said drive means to said counters and each having a driving member and a driven member, a locking collar fixed to said shaft and having a notch and a tooth, a locking bar having a pair of lugs with a notch therebetween, said lugs being adapted to extend into the notch of said collar and the notch of said locking bar being adapted to accommodate said collar, a dog cooperating with said tooth of said collar, a pivoted brake member for holding the disengaged driven members of said clutches against rotation, and a manually indexible knob for shifting said shaft, collar, clutches, and brake.

GEORGE J. GRIZEY.